(12) United States Patent
Kitahara et al.

(10) Patent No.: US 7,911,712 B2
(45) Date of Patent: Mar. 22, 2011

(54) IMAGING LENS AND IMAGING APPARATUS

(75) Inventors: Yu Kitahara, Saitama (JP); Yoko Yamamoto, Saitama (JP); Taro Asami, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/607,753

(22) Filed: Oct. 28, 2009

(65) Prior Publication Data
US 2010/0103537 A1    Apr. 29, 2010

(30) Foreign Application Priority Data

Oct. 29, 2008  (JP) .............................. P2008-277691

(51) Int. Cl.
G02B 9/60    (2006.01)
(52) U.S. Cl. ........................................ 359/770; 359/763
(58) Field of Classification Search .......... 359/754–756, 359/761, 763, 770
See application file for complete search history.

(56) References Cited

U.S. PATENT DOCUMENTS

| | | | | |
|---|---|---|---|---|
| 4,223,982 A | * | 9/1980 | Sugiyama | 359/761 |
| 6,747,814 B2 | * | 6/2004 | Abe | 359/746 |
| 6,833,967 B2 | | 12/2004 | Sekita | |
| 2003/0112529 A1 | * | 6/2003 | Sekita | 359/770 |

FOREIGN PATENT DOCUMENTS

| | | |
|---|---|---|
| JP | 3-63613 A | 3/1991 |
| JP | 10-293246 A | 11/1998 |
| JP | 3254239 B2 | 2/2002 |
| JP | 2002-228925 A | 8/2002 |
| JP | 2002-277734 A | 9/2002 |
| JP | 2003-329925 A | 11/2003 |
| JP | 2008-8960 A | 1/2008 |

* cited by examiner

Primary Examiner — Darryl J Collins
(74) Attorney, Agent, or Firm — Birch, Stewart, Kolasch & Birch, LLP

(57) ABSTRACT

An imaging lens includes, in order from an object side, a first lens having a negative power and including a concave image-side surface, a second lens having a positive power, a stop, a third negative lens, which is a biconcave lens, a fourth lens having a positive power, and a fifth lens having a positive power and including a convex image-side surface. The imaging lens satisfies the following conditional expressions:

$$0.18 < (D4+D5)/f < 0.44, \text{ and}$$

$$0.18 < D1/f$$

where f denotes a focal length of an entire lens system, D1 denotes a thickness of a center of the first lens, D4 denotes a distance from an image-side surface of the second lens to the stop on an optical axis, and D5 denotes a distance from the stop to an object-side surface of the third lens on the optical axis.

16 Claims, 10 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

FIG.10A
EXAMPLE 1

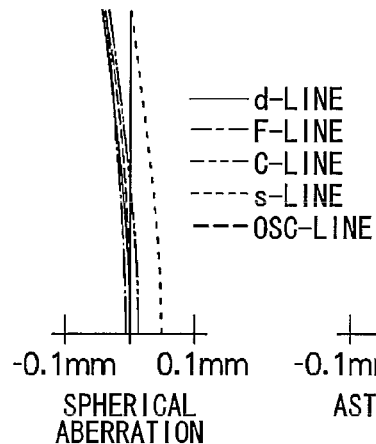

Fno. = 2.00

— d-LINE
—·— F-LINE
— — C-LINE
······ s-LINE
— — OSC-LINE

-0.1mm    0.1mm
SPHERICAL
ABERRATION

FIG.10B
EXAMPLE 1

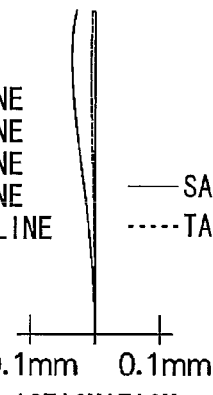

ω=24.2°

——— SAGITTAL
······ TANGENTIAL

-0.1mm    0.1mm
ASTIGMATISM

FIG.10C
EXAMPLE 1

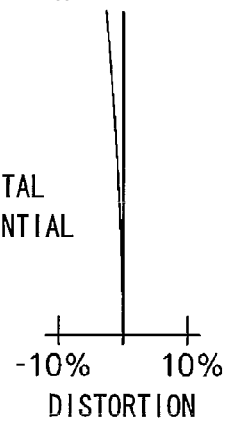

ω=24.2°

-10%    10%
DISTORTION

FIG.10D
EXAMPLE 1

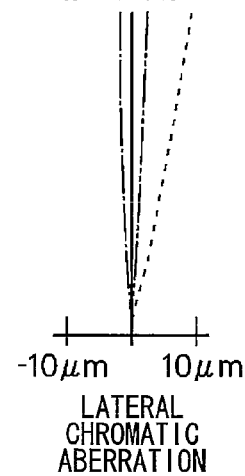

ω=24.2°

-10μm    10μm
LATERAL
CHROMATIC
ABERRATION

FIG.11A
EXAMPLE 2

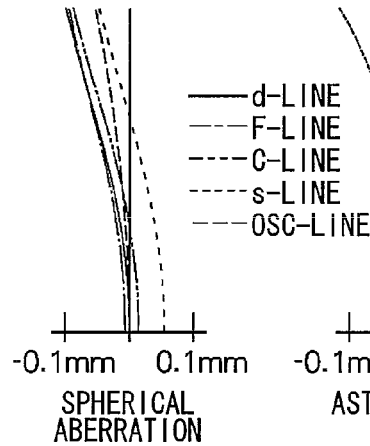

Fno. = 2.00

— d-LINE
—·— F-LINE
— — C-LINE
······ s-LINE
— — OSC-LINE

-0.1mm    0.1mm
SPHERICAL
ABERRATION

FIG.11B
EXAMPLE 2

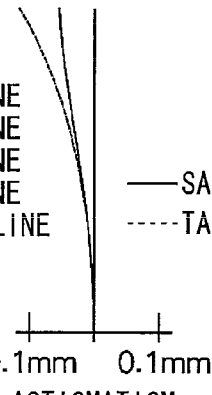

ω=24.4°

——— SAGITTAL
······ TANGENTIAL

-0.1mm    0.1mm
ASTIGMATISM

FIG.11C
EXAMPLE 2

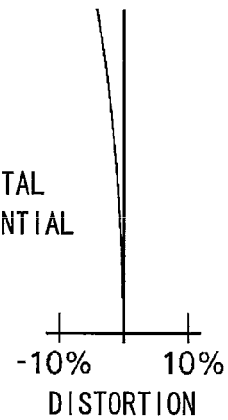

ω=24.4°

-10%    10%
DISTORTION

FIG.11D
EXAMPLE 2

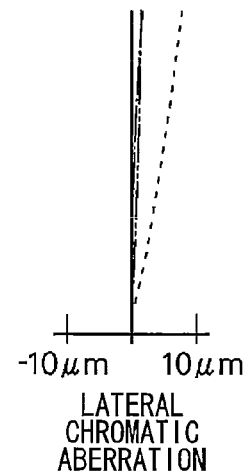

ω=24.4°

-10μm    10μm
LATERAL
CHROMATIC
ABERRATION

FIG.12A EXAMPLE 3
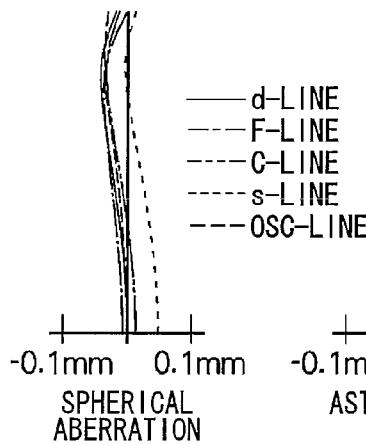
FIG.12B EXAMPLE 3
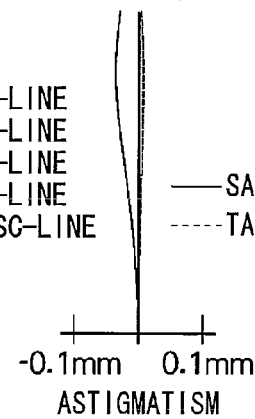
FIG.12C EXAMPLE 3
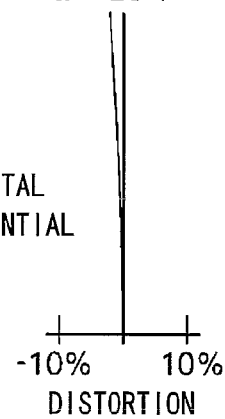
FIG.12D EXAMPLE 3
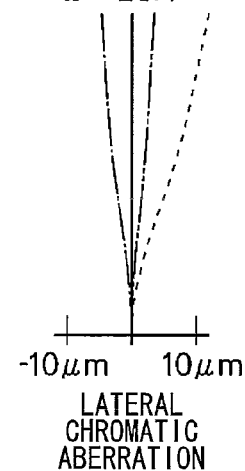
FIG.13A EXAMPLE 4
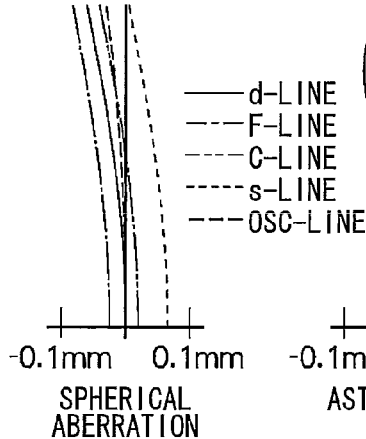
FIG.13B EXAMPLE 4
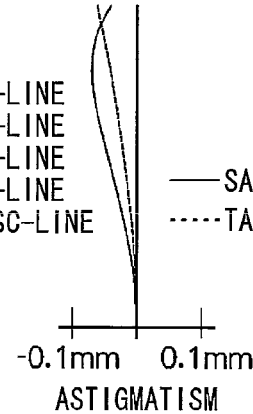
FIG.13C EXAMPLE 4
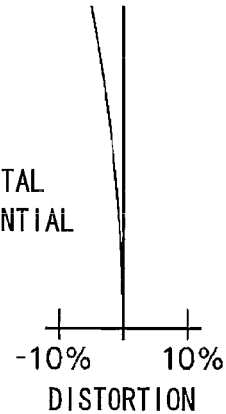
FIG.13D EXAMPLE 4
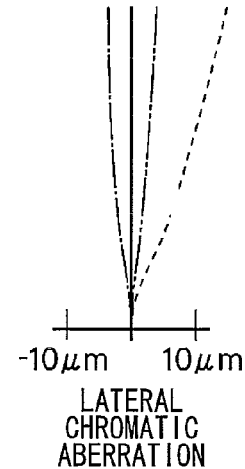

FIG.14A
EXAMPLE 5

Fno. = 2.00

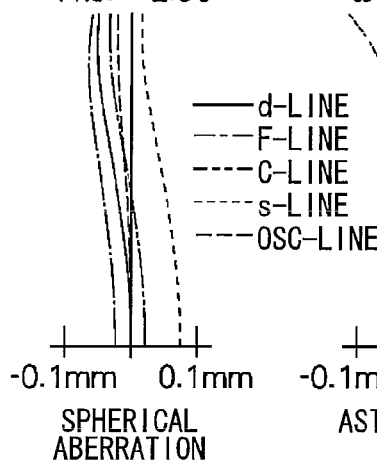

—— d-LINE
—·— F-LINE
---- C-LINE
······ s-LINE
—·· OSC-LINE

-0.1mm  0.1mm
SPHERICAL
ABERRATION

FIG.14B
EXAMPLE 5

ω=20.7°

—— SAGITTAL
---- TANGENTIAL

-0.1mm  0.1mm
ASTIGMATISM

FIG.14C
EXAMPLE 5

ω=20.7°

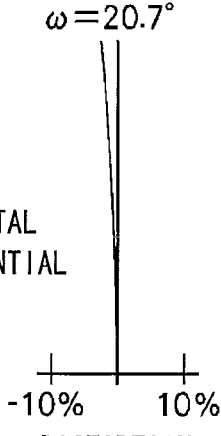

-10%   10%
DISTORTION

FIG.14D
EXAMPLE 5

ω=20.7°

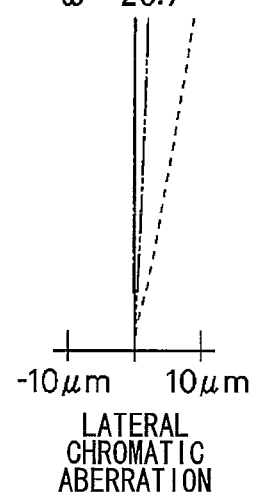

-10μm  10μm
LATERAL
CHROMATIC
ABERRATION

FIG.15A
EXAMPLE 6

Fno. = 2.00

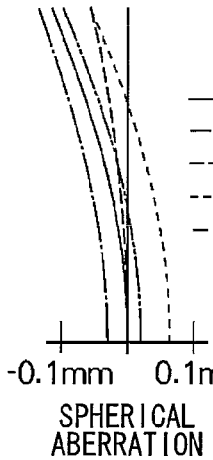

—— d-LINE
—·— F-LINE
---- C-LINE
······ s-LINE
—·· OSC-LINE

-0.1mm  0.1mm
SPHERICAL
ABERRATION

FIG.15B
EXAMPLE 6

ω=28.9°

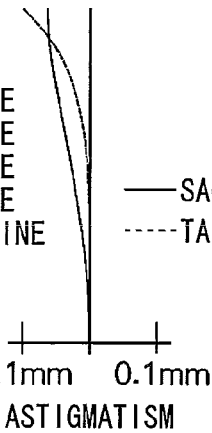

—— SAGITTAL
---- TANGENTIAL

-0.1mm  0.1mm
ASTIGMATISM

FIG.15C
EXAMPLE 6

ω=28.9°

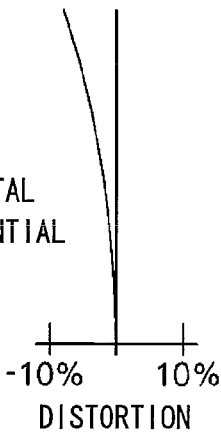

-10%   10%
DISTORTION

FIG.15D
EXAMPLE 6

ω=28.9°

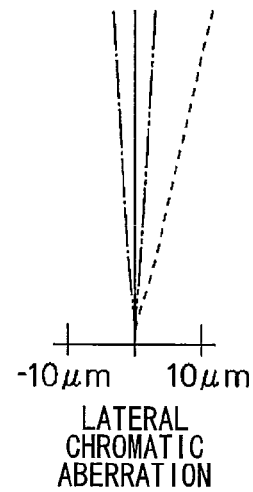

-10μm  10μm
LATERAL
CHROMATIC
ABERRATION

EXAMPLE 7

SPHERICAL ABERRATION

EXAMPLE 7

ASTIGMATISM

EXAMPLE 7

DISTORTION

EXAMPLE 7

LATERAL CHROMATIC ABERRATION

EXAMPLE 8

SPHERICAL ABERRATION

EXAMPLE 8

ASTIGMATISM

EXAMPLE 8

DISTORTION

EXAMPLE 8

LATERAL CHROMATIC ABERRATION

IMAGING LENS AND IMAGING APPARATUS

CROSS-REFERENCE TO RELATED APPLICATIONS

This application is based upon and claims the benefit of priority from the Japanese Patent Application No. 2008-277691 filed Oct. 29, 2008; the entire contents of which are incorporated herein by reference.

BACKGROUND OF THE INVENTION

1. Field of the Invention

The present invention relates to an imaging lens used for an in-vehicle camera or a monitoring camera using an imaging device, such as a CCD or a CMOS, and more particularly, to an imaging lens used for an in-vehicle camera that captures the images of the front, side, and rear of a vehicle.

2. Description of the Related Art

In recent years, the size of an imaging device, such as a CCD or a CMOS, has been reduced, and the number of pixels thereof has increased. Therefore, it is necessary to reduce the size and weight of an imaging apparatus body and an imaging lens provided therein. Meanwhile, for example, in-vehicle cameras or monitoring cameras require a high-performance and inexpensive lens that has high weather resistance, that can be used in a wide temperature range in a vehicle from a low temperature in a cold region to a high temperature in a tropical region, and that has such a small F number that it can be used at night.

For example, Japanese Patent No. 3723654, JP-A-2003-329925, JP-A-10-293246, JP-A-2002-277734, JP-A-2002-228925, JP-A-03-063613, and JP-A-2008-008960 disclose imaging lenses that meet the requirements. The disclosed imaging lenses each have a five-lens optical system including a relatively small number of lenses.

However, in the imaging lenses, with an improvement in the performance of an imaging device used for an imaging apparatus, it is necessary to reduce the size and manufacturing costs of the imaging lens and improve the brightness thereof. However, in the optical system according to the related art, it is difficult to achieve a small, fast, and inexpensive imaging lens capable of meeting the requirements.

SUMMARY OF THE INVENTION

The invention has been made in order to solve the above-mentioned problems, and an object of the invention is to provide a small, fast, and inexpensive imaging lens and an imaging apparatus including the imaging lens.

According to an aspect of the invention, an imaging lens includes a first lens, a second lens, a stop, a third lens, a fourth lens and a fifth lens. The first lens has a negative power and includes a concave surface facing an image side. The second lens has a positive power. The third negative lens is a biconcave lens. The fourth lens has a positive power. The fifth lens has a positive power and includes a convex surface facing an image side. The first to fifth lenses are arranged in this order from the object side. The imaging lens satisfies conditional expressions 1 and 2 given below:

$0.18 < (D4+D5)/f < 0.44,$ [Conditional expression 1] and $0.18 < D1/f$ [Conditional expression 2]

where f denotes a focal length of an entire lens system, D1 denotes a thickness of a center of the first lens, D4 denotes a distance from an image-side surface of the second lens to the stop on an optical axis, and D5 denotes a distance from the stop to an object-side surface of the third lens on the optical axis.

With the above-mentioned structure, it is possible to obtain a sufficient optical performance even when the first to fifth lenses are spherical lenses, without using an expensive aspheric lens. Therefore, it is possible to achieve a small, fast, and inexpensive imaging lens.

In the imaging lens according to the above-mentioned aspect, the second lens may be a biconvex lens, and an absolute value of a curvature radius of an object-side surface of the second lens may be smaller than that of an absolute value of a curvature radius of the image-side surface of the second lens.

The fourth lens may be a meniscus lens or a plano-convex lens having a convex surface facing the image side.

The fifth lens may be a biconvex lens.

The imaging lens may satisfy conditional expression 3 given below:

$v2 < 39$ [Conditional expression 3]

where v2 denotes the Abbe number of the second lens at the d-line.

The imaging lens may satisfy conditional expression 4 given below:

$16.0 \text{ mm} < L < 27.0 \text{ mm}$ [Conditional expression 4]

where L denotes a distance from a top of an object-side surface of the first lens to an image formation surface.

The imaging lens may satisfy conditional expression 5 given below:

$5.0 \text{ mm} < f < 9.0 \text{ mm}$ [Conditional expression 5]

where f denotes the focal length of the entire lens system.

The imaging lens may satisfy conditional expression 6 given below:

$0.2 < D2/f < 0.7$ [Conditional expression 6]

where f denotes the focal length of the entire lens system, and D2 denotes an air space between the first lens and the second lens.

The imaging lens may satisfy conditional expression 7 given below:

$0.5 < Bf/f < 1.5$ [Conditional expression 7]

where f denotes the focal length of the entire lens system, and Bf denotes an air equivalent distance from a top of an image-side surface of the fifth lens to an image formation surface.

The imaging lens may satisfy conditional expression 8 given below:

$-2.2 < f1/f < -1.2$ [Conditional expression 8]

where f denotes the focal length of the entire lens system, and f1 denotes a focal length of the first lens.

The imaging lens may satisfy conditional expression 9 given below:

$0.8 < f345/f$ [Conditional expression 9]

where f denotes the focal length of the entire lens system, and f345 denotes a composite focal length of the third to fifth lenses.

The imaging lens may satisfy conditional expression 10 given below:

$0.30 < |R6/R7| < 1.50$ [Conditional expression 10]

where R6 denotes a curvature radius of the object-side surface of the third lens, and R7 denotes a curvature radius of an image-side surface of the third lens.

v1 may be equal to or greater than 40, and v4 and v5 may be equal to or greater than 35 where v1 denotes the Abbe number of the first lens at the d-line, v4 denotes the Abbe number of the fourth lens at the d-line, and v5 denotes the Abbe number of the fifth lens at the d-line.

The imaging lens may satisfy conditional expression 11 given below:

$$0.3 < |f12/f345| < 1.4 \quad \text{[Conditional expression 11]}$$

where f12 denotes the composite focal length of the first lens and the second lens, and f345 denotes a composite focal length of the third to fifth lenses.

The imaging lens may satisfy conditional expressions 12-3 and 3-2 given below:

$$1.81 \leq N2 < 1.92, \quad \text{[Conditional expression 12-3] and}$$

$$25 < v2 < 38 \quad \text{[Conditional expression 3-2]}$$

where N2 denotes a refractive index of the second lens at a d-line, and v2 denotes the Abbe number of the second lens at the d-line.

According to another aspect of the invention, an imaging apparatus includes the imaging lens according to the above-mentioned aspect.

According to the above-mentioned aspect of the invention, the imaging lens includes the first lens that has the negative power and includes the concave surface facing the image side, the second lens having the positive power, the stop, the third negative lens, which is the biconcave lens, the fourth lens having the positive power, and the fifth lens that has the positive power and includes the convex surface facing the image side. The first to fifth lenses are arranged in this order from the object side. When the focal length of the entire lens system is f, the thickness of the center of the first lens is D1, the distance from the image-side surface of the second lens to the stop on the optical axis is D4, and the distance from the stop to the object-side surface of the third lens on the optical axis is D5, the imaging lens satisfies conditional expressions 1 and 2. Therefore, it is possible to achieve a small, fast, and inexpensive imaging lens.

The imaging apparatus according to the invention includes the imaging lens according to the above-mentioned aspect. Therefore, it is possible to manufacture a small and inexpensive imaging apparatus capable of obtaining a bright and high-quality image.

BRIEF DESCRIPTION OF THE DRAWINGS

FIGS. 10A to 10D are diagrams illustrating the aberrations of the imaging lens according to Example 1, in which FIG. 10A shows spherical aberration, FIG. 10B shows astigmatism, FIG. 10C shows distortion, and FIG. 10D shows lateral chromatic aberration;

FIGS. 11A to 11D are diagrams illustrating the aberrations of the imaging lens according to Example 2, in which FIG. 11A shows spherical aberration, FIG. 11B shows astigmatism, FIG. 11C shows distortion, and FIG. 11D shows lateral chromatic aberration;

FIGS. 12A to 12D are diagrams illustrating the aberrations of the imaging lens according to Example 3, in which FIG. 12A shows spherical aberration, FIG. 12B shows astigmatism, FIG. 12C shows distortion, and FIG. 12D shows lateral chromatic aberration;

FIGS. 13A to 13D are diagrams illustrating the aberrations of the imaging lens according to Example 4, in which FIG. 13A shows spherical aberration, FIG. 13B shows astigmatism, FIG. 13C shows distortion, and FIG. 13D shows lateral chromatic aberration;

FIGS. 14A to 14D are diagrams illustrating the aberrations of the imaging lens according to Example 5, in which FIG. 14A shows spherical aberration, FIG. 14B shows astigmatism, FIG. 14C shows distortion, and FIG. 14D shows lateral chromatic aberration;

FIGS. 15A to 15D are diagrams illustrating the aberrations of the imaging lens according to Example 6, in which FIG. 15A shows spherical aberration, FIG. 15B shows astigmatism, FIG. 15C shows distortion, and FIG. 15D shows lateral chromatic aberration;

FIGS. 16A to 16D are diagrams illustrating the aberrations of the imaging lens according to Example 7, in which FIG. 16A shows spherical aberration, FIG. 16B shows astigmatism, FIG. 16C shows distortion, and FIG. 16D shows lateral chromatic aberration;

FIGS. 17A to 17D are diagrams illustrating the aberrations of the imaging lens according to Example 8, in which FIG. 17A shows spherical aberration, FIG. 17B shows astigmatism, FIG. 17C shows distortion, and FIG. 17D shows lateral chromatic aberration.

DESCRIPTION OF THE PREFERRED EMBODIMENTS

Hereinafter, exemplary embodiments of the invention will be described in detail with reference to the accompanying drawings. First, an imaging lens according to an embodiment of the invention will be described with reference to FIG. 1, and then an imaging apparatus according to another embodiment of the invention will be described.

Figure 1:
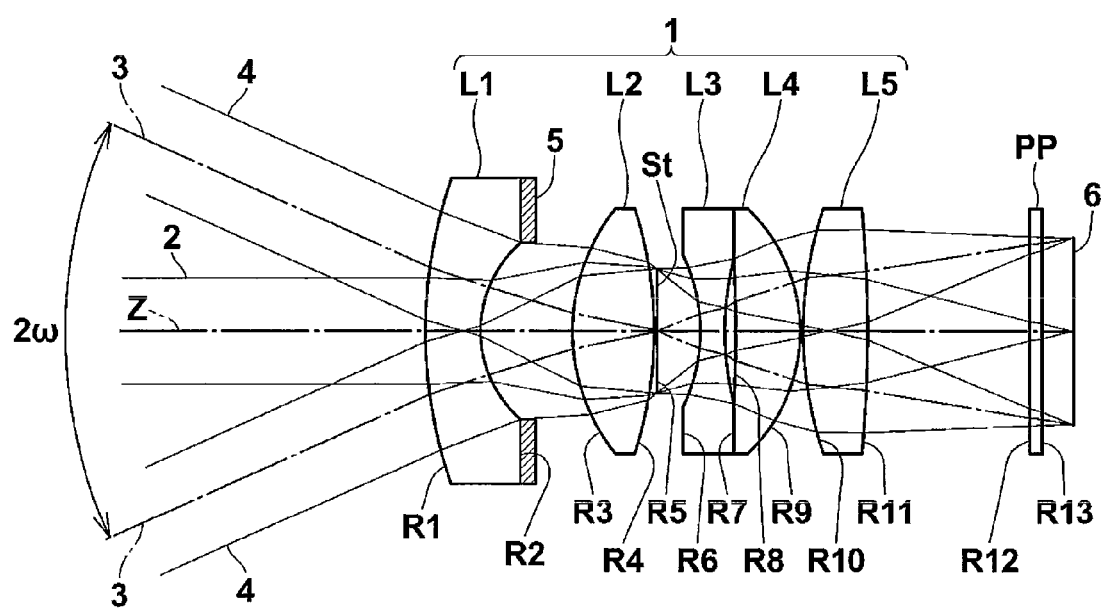
FIG. 1 is a diagram illustrating an optical path of an imaging lens according to an embodiment of the invention.

FIG. 1 is a cross-sectional view illustrating an imaging lens 1 according to an embodiment of the invention. FIG. 1 also shows the focusing of an outermost ray 2 of on-axis ray (optical axis Z), a principal ray 3 of off-axis ray, and an outermost beam 4 of the off axial ray.

The imaging lens 1 includes a first lens L1 that has a negative power and includes a concave surface facing an image side, a second lens L2 having a positive power, an aperture diaphragm St, a third negative lens L3, which is a biconcave lens, a fourth lens L4 having a positive power, and a fifth lens L5 that has a positive power and includes a convex surface facing the image side. The first to fifth lenses are arranged in this order from an object side along an optical axis Z. FIG. 1 does not show the shape or size of the aperture diaphragm St, but shows the position of the aperture diaphragm St on the optical axis Z.

FIG. 1 also shows an imaging device 6 that is arranged on an image surface including the imaging position of the imaging lens 1, considering a case where the imaging lens 1 is applied to an imaging apparatus. The imaging device 6 converts an optical image formed by the imaging lens 1 into electric signals, and is composed of, for example, a CCD image sensor.

When the imaging lens is applied to an imaging apparatus, it is preferable to provide, for example, a cover glass, a low pass filter, or an infrared cut filter between the fifth lens L5 and the image surface according to the structure of a camera provided with the lens. FIG. 1 shows an example in which an optical member PP, which is a plane parallel plate, is provided between the fifth lens L5 and the image surface considering the above. For example, when the imaging lens 1 is used for a night-vision camera that is provided in a vehicle to aid night vision, a filter that cuts from blue light to ultraviolet light may be provided between the fifth lens L5 and the image surface.

Instead of providing a low pass filter or various filters for cutting a specific wavelength band between the fifth lens L5 and the image surface, various filters may be provided between the lenses. Alternatively, a coat having the same effect as various filters may be formed on the lens surface of any lens of the imaging lens 1.

When the focal length of the entire lens system is f, the thickness of the center of the first lens L1 is D1, the distance from an image-side surface of the second lens L2 to the aperture diaphragm St on the optical axis Z is D4, and the distance from the aperture diaphragm St to an object-side surface of the third lens L3 on the optical axis Z is D5, the imaging lens 1 satisfies Conditional expressions 1 and 2 given below:

$$0.18 < (D4+D5)/f < 0.44,$$ [Conditional expression 1] and $$0.18 < D1/f.$$ [Conditional expression 2]

If the value of (D4+D5)/f is greater than the upper limit of Conditional expression 1, the distance from the second lens L2 to the third lens L3 is excessively long, and the total length is excessively large. In addition, the diameter of the lenses before the aperture diaphragm St are increased. Therefore, it is difficult to reduce the size of an imaging lens. On the other hand, if the value is less than the lower limit of Conditional expression 1, the distance from the second lens L2 to the third lens L3 is excessively short. As a result, it is difficult to effectively correct field curvature and comatic aberration.

For example, when the imaging apparatus is used as an in-vehicle camera, the first lens L1 needs to have sufficient strength against various collisions since it is exposed to the outside. If the value of D1/f is less than the lower limit of Conditional expression 2, the first lens L1 is likely to be cracked. When the imaging lens satisfies Conditional expression 2, the first lens L1 has a sufficiently large thickness to be resistant to various collisions.

According to the above-mentioned structure, it is possible to obtain a sufficient optical performance even when the first to fifth lenses are spherical lenses without using expensive aspheric lenses. Therefore, it is possible to achieve a small, fast, and inexpensive imaging lens.

In the imaging lens 1, it is preferable that the second lens L2 be a biconvex lens. In addition, it is preferable that the absolute value of the curvature radius of the object-side surface of the second lens L2 be smaller than that of the curvature radius of the image-side surface thereof. When the absolute value of the curvature radius of the object-side surface of the second lens L2 is smaller than that of the curvature radius of the image-side surface thereof, it is possible to effectively correct spherical aberration and comatic aberration.

It is preferable that the fourth lens L4 be a meniscus lens or a plano-convex lens having a convex surface facing the image side. When the fourth lens L4 is a meniscus lens or a plano-convex lens having a convex surface facing the image side, it is possible to effectively correct field curvature. In addition, when the fourth lens L4 is a meniscus lens or a plano-convex lens having a convex surface facing the image side, it is possible to contact the flat surfaces of the third lens L3 and the fourth lens L4. For example, when the imaging lens is used for an in-vehicle camera and the edges of the lenses come into contact with each other, the edges are broken due to vibration, and the broken pieces serve as foreign materials, which causes a ghost. However, when the flat surfaces of the lenses come into contact with each other, it is possible to manufacture a lens having high resistance to vibration.

It is preferable that the fifth lens L5 be a biconvex lens. In addition, it is preferable that the absolute value of the curvature radius of the object-side surface of the fifth lens L5 be smaller than that of the curvature radius of the image-side surface thereof. When the absolute value of the curvature radius of the object-side surface of the fifth lens L5 is smaller than that of the curvature radius of the image-side surface thereof, it is possible to more effectively correct spherical aberration and comatic aberration.

When the Abbe number of the second lens L2 at the d-line is $\nu 2$, it is preferable that the imaging lens 1 satisfy Conditional expression 3 given below:

$$\nu 2 < 39.$$ [Conditional expression 3]

If the Abbe number is greater than the upper limit of Conditional expression 3, it is difficult to effectively correct longitudinal chromatic aberration.

It is preferable that the imaging lens satisfy Conditional expression 3-2 given below:

$$25 < \nu 2 < 38.$$ [Conditional expression 3-2]

If the Abbe number satisfies the upper limit of Conditional expression 3-2, it is possible to effectively correct longitudinal chromatic aberration. If the Abbe number satisfies the lower limit of Conditional expression 3-2, it is possible to effectively correct lateral chromatic aberration.

When the distance from the top of the object-side surface of the first lens L1 to the imaging device 6 is L, it is preferable that the imaging lens 1 satisfy Conditional expression 4 given below:

$$16.0 \text{ mm} < L < 27.0 \text{ mm}.$$ [Conditional expression 4]

If the distance is greater than the upper limit of Conditional expression 4, the size of the lens system is increased, and it is difficult to achieve a small imaging lens. If the distance is less than the lower limit of Conditional expression 4, it is possible to reduce the size of the imaging lens, but the thickness of each lens is excessively small. As a result, it is difficult to process the lens.

In addition, it is more preferable that the imaging lens 1 satisfy Conditional expression 4-2 given below:

$$19.0 \text{ mm} < L < 26.0 \text{ mm}.$$ [Conditional expression 4-2]

If the imaging lens satisfies Conditional expression 4-2, it is possible to further reduce the size of the lens system.

When the focal length of the entire lens system is f, it is preferable that the imaging lens 1 satisfy Conditional expression 5 given below:

$$5.0 \text{ mm} < f < 9.0 \text{ mm}.$$ [Conditional expression 5]

If the focal length is greater than the upper limit of Conditional expression 5, it is difficult to sufficiently increase an angle of view. If the focal length is less than the lower limit of Conditional expression 5, it is possible to sufficiently increase an angle of view, but it is difficult to increase the back focal length.

When the focal length of the entire lens system is f and the air space between the first lens L1 and the second lens L2 is D2, it is preferable that the imaging lens 1 satisfy Conditional expression 6 given below:

$$0.2 < D2/f < 0.7.$$ [Conditional expression 6]

If the value of D2/f is greater than the upper limit of Conditional expression 6, the gap between the first lens L1 and the second lens L2 is excessively large and the diameter of the first lens L1 is increased. As a result, it is difficult to reduce the size of an imaging lens. If the value is less than the lower limit of Conditional expression 6, the gap between the first lens L1 and the second lens L2 is excessively small, and it is difficult to increase the back focal length.

When the focal length of the entire lens system is f and an air equivalent distance from the top of the image-side surface of the fifth lens L5 to the imaging device is Bf, it is preferable that the imaging lens 1 satisfy Conditional expression 7 given below:

$$0.5 < Bf/f < 1.5.$$ [Conditional expression 7]

If the value of Bf/f is greater than the upper limit of Conditional expression 7, the back focal length is excessively large and the total length of the imaging lens is increased or, it is difficult to increase an angle of view. If the value is less than the lower limit of Conditional expression 7, the back focal length is reduced, and it is difficult to insert various filters or a cover glass between the imaging lens 1 and the imaging device 6. In addition, a ghost is likely to occur due to light reflected from the light receiving surface of the imaging device 6.

It is preferable that the back focal length Bf of the imaging lens 1 be equal to or greater than 5 mm. When the back focal length Bf is equal to or greater than 5 mm, it is easy to insert various filters or a cover glass between the imaging lens 1 and the imaging device 6. In addition, it is possible to prevent the occurrence of a ghost due to light reflected from the light receiving surface of the imaging device 6. If the back focal length Bf is equal to or greater than 6 mm, it is easier to prevent the occurrence of a ghost due to light reflected from the light receiving surface of the imaging device 6.

When the focal length of the entire lens system is f and the focal length of the first lens L1 is f1, it is preferable that the imaging lens 1 satisfy Conditional expression 8 given below:

$$-2.2 < f1/f < -1.2.$$ [Conditional expression 8]

If the value of f1/f is greater than the upper limit of Conditional expression 8, the power of the first lens L1 is excessively high, and it is difficult to correct spherical aberration. If the value is less than the lower limit of Conditional expression 8, the power of the first lens L1 is excessively low, and it is difficult to sufficiently increase an angle of view.

When the focal length of the entire lens system is f and the composite focal length of the third to fifth lenses is f345, it is preferable that the imaging lens 1 satisfy Conditional expression 9 given below:

$$0.8 < f345/f.$$ [Conditional expression 9]

If the value of f345/f is less than the lower limit of Conditional expression 9, it is difficult to effectively correct field curvature and comatic aberration.

When the curvature radius of the object-side surface of the third lens L3 is R6 and the curvature radius of the image-side surface of the third lens L3 is R7, it is preferable that the imaging lens 1 satisfy Conditional expression 10 given below:

$$0.30 < |R6/R7| < 1.50.$$ [Conditional expression 10]

If the absolute value is greater than the upper limit of Conditional expression 10, spherical aberration and field curvature are not sufficiently corrected, and it is difficult to obtain a high-quality image. If the absolute value is less than the lower limit of Conditional expression 10, the back focal length is excessively large. As a result, the total length of the imaging lens is increased, and it is difficult to reduce the size of the imaging lens.

In the imaging lens 1, when the Abbe number of the first lens L1 at the d-line is ν1, the Abbe number of the fourth lens L4 at the d-line is ν4, and the Abbe number of the fifth lens L5 at the d-line is ν5, it is preferable that ν1 be equal to or greater than 40 and ν4 and ν5 be equal to or greater than 35. When ν1 is equal to or greater than 40 and ν4 and ν5 are equal to or greater than 35, it is possible to correct various aberrations while preventing chromatic aberration. When the Abbe number of the third lens L3 at the d-line is ν3, it is preferable that ν3 be equal to or less than 30. When ν3 is equal to or less than 30, it is possible to effectively correct longitudinal chromatic aberration and lateral chromatic aberration.

When the focal length of the entire lens system is f, the composite focal length of the first and second lenses is f12, and the composite focal length of the third to fifth lenses is f345, it is preferable that the imaging lens 1 satisfy Conditional expression 11 given below:

$$0.3 < |f12/f345| < 1.4.$$ [Conditional expression 11]

If the absolute value is greater than the upper limit of Conditional expression 11, the total length of the imaging lens is increased, and it is difficult to reduce the size of the imaging lens. If the absolute value is less than the lower limit of Conditional expression 11, it is difficult to correct field curvature.

When the refractive index of the second lens L2 at the d-line is N2, it is preferable that the imaging lens 1 satisfy Conditional expression 12 given below:

$$1.75 < N2.$$ [Conditional expression 12]

If the refractive index is less than the lower limit of Conditional expression 12, the curvature radii of the front and rear surfaces of the second lens L2 are reduced. As a result, it is difficult to process the lens or obtain a high positive power.

When the imaging lens is configured so as to satisfy the following Conditional expression 12-2, it is easy to obtain the second lens L2 having a high positive power:

$$1.80 < N2.$$ [Conditional expression 12-2]

It is preferable that the imaging lens satisfy Conditional expression 12-3 given below:

$$1.81 \leq N2 < 1.92.$$ [Conditional expression 12-3]

If the refractive index satisfies the upper limit of Conditional expression 12-3, it is possible to expand the range of selection for materials, and material cost can be reduced. Therefore, it is easy to reduce manufacturing costs. When the refractive index is greater than the lower limit of Conditional expression 12-3, it is easy to obtain the second lens having a high positive power.

When the focal length of the entire lens system is f and the focal length of the second lens L2 is f2, it is preferable that the imaging lens 1 satisfy Conditional expression 13 given below:

$$0.6 < f2/f < 1.1. \qquad \text{[Conditional expression 13]}$$

If the value of f2/f is greater than the upper limit of Conditional expression 13, the power of the second lens L2 is lowered, and the size of the lens system is increased. If the value is less than the lower limit of Conditional expression 13, the power of the second lens L2 is excessively high, and it is difficult to correct spherical aberration.

When the focal length of the entire lens system is f and the distance from the top of the object-side surface of the first lens L1 to the imaging device 6 is L, it is preferable that the imaging lens 1 satisfy Conditional expression 14 given below:

$$2.0 < L/f < 4.0. \qquad \text{[Conditional expression 14]}$$

If the value of L/f is greater than the upper limit of Conditional expression 14, the size of the lens system is increased. If the value is less than the lower limit of Conditional expression 14, it is possible to easily reduce the size of the lens system, but it is difficult to sufficiently increase an angle of view.

When the distance from the second lens L2 to the aperture diaphragm St is D4 and the distance from the aperture diaphragm St to the third lens L3 is D5, it is preferable that the imaging lens 1 satisfy Conditional expression 15 given below:

$$D4/D5 < 1.5. \qquad \text{[Conditional expression 15]}$$

If the value of D4/D5 is greater than the upper limit of Conditional expression 15, the aperture diaphragm St is close to the third lens L3 and the beam height of a beam passing through the first lens L1 and the second lens L2 is increased. As a result, the diameter of the lens is increased. For example, when the imaging lens is used as an in-vehicle camera lens, it is preferable that the diameter of the first lens L1 exposed to the outside be small such that the outer appearance of the vehicle is not damaged.

In the imaging lens 1, when an ideal image height is f tan θ, it is preferable that distortion be equal to or less than ±10%. When distortion is equal to or less than ±10%, it is possible to obtain an image with small distortion. When distortion is equal to or less than ±5%, it is possible to further reduce the distortion of an image.

For example, when the imaging lens is used in a severe environment, such as in an in-vehicle camera, it is preferable that the first lens L1 arranged closest to the object side be made of a material capable of preventing the deterioration of the surface of the lens due to rain and wind and temperature variation due to direct exposure to sunlight, and having high resistance to chemicals, such as oils, fats, and detergent, that is, a material having high water resistance, high weather resistance, high acid resistance, and high chemical resistance. In addition, it is preferable that the first lens L1 arranged closest to the object side be made of a hard and splinterless material. Specifically, it is preferable that the first lens L1 be made of glass or transparent ceramics. The strength and heat resistance of the ceramics are higher than those of general glass.

When the imaging lens 1 is applied to, for example, an in-vehicle camera, the imaging lens 1 needs to be used in a wide temperature range in the vehicle from a low temperature in a cold region to a high temperature in a tropical region. When the imaging lens 1 is used in the wide temperature range, all the lenses are preferably made of glass. Specifically, it is preferable that the imaging lens be used in a wide temperature range of −40° C. to 125° C. It is preferable that all the lenses be spherical lenses in order to reduce manufacturing costs. However, when priority is given to the optical performance over costs, aspheric lenses may be used.

There is a concern that a beam passing through a portion of each lens other than the effective diameter between the first lens L1 and the second lens L2 of the imaging lens 1 will be incident as stray light on the image surface and serve as a ghost. Therefore, it is preferable to provide a light shielding unit 5 that shields the stray light between the first lens L1 and the second lens L2, since there is a concern that a beam passing outside the outermost beam 4 of the off-axis beams in FIG. 1 will become stray light. As the light shielding unit 5, for example, an opaque pigment may be coated on a portion of the image-side surface of the first lens L1 other than the effective diameter, or an opaque plate may be provided. Alternatively, an opaque plate may be provided on the optical path of a beam, serving as stray light, thereby forming a light shielding unit. The light shielding unit may be provided between other lenses, in addition to between the first lens L1 and the second lens L2, if necessary. For example, a hood that shields the stray light may be provided on the object side of the first lens L1.

EXAMPLES

Next, detailed numerical examples of the imaging lens 1 according to the invention will be described.

Example 1

Figure 2:
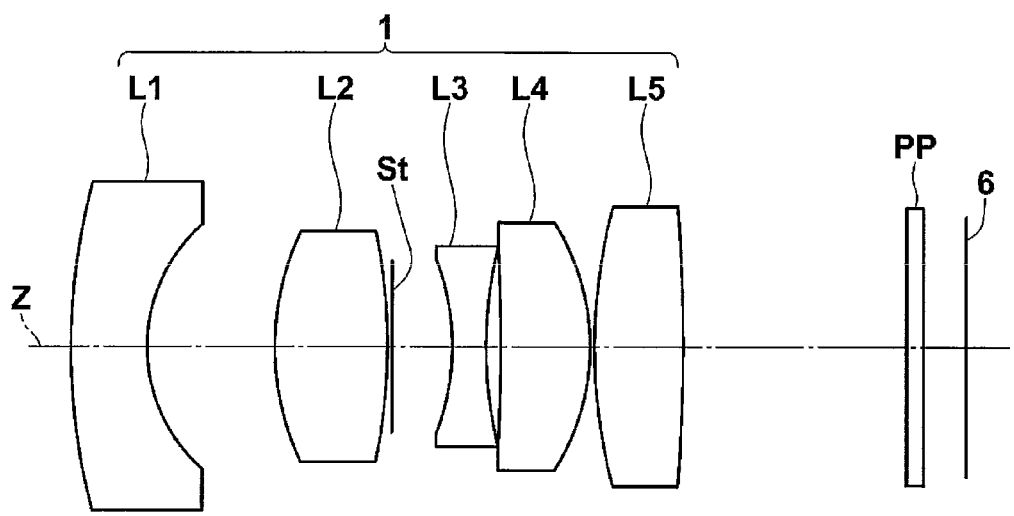
FIG. 2 is a cross-sectional view illustrating the structure of an imaging lens according to Example 1 of the invention.

Lens data, various data, and expression data of an imaging lens according to Example 1 are shown in Table 1, and the structure of the imaging lens is shown in FIG. 2.

In the lens data shown in Table 1, the surface number of a component from the object side is represented as an i-th (i=1, 2, 3, . . . ) surface number. In this case, the surface of a component closest to the object side is given number 1, and the surface number is sequentially increased toward the image side. In addition, the lens data shown in Table 1 includes the aperture diaphragm St and the optical member PP.

In Table 1, Ri indicates the curvature radius of the i-th (i=1, 2, 3, . . . ) surface, and Di indicates the surface spacing between the i-th (i=1, 2, 3, . . . ) surface and an (i+1)-th surface on the optical axis Z. In addition, Ndj indicates the refractive index of a j-th (j=1, 2, 3, . . . ) optical component at the d-line. In this case, an optical component arranged closest to the object side is given number 1, and the number is sequentially increased toward the image side. In addition, vdj indicates the Abbe number of the j-th optical component at the d-line. In Table 1, the units of the curvature radius and the surface spacing are millimeters (mm). When the lens surface is convex toward the object side, the curvature radius thereof has a positive value. When the lens surface is convex toward the image side, the curvature radius thereof has a negative value.

In various data shown in Table 1, L indicates the distance from the object-side surface of the first lens L1 in the entire lens system to the image surface on the optical axis Z (the back focal length, which is an air equivalent length), Bf indicates the back focal length (which is an air equivalent length), f indicates the focal length of the entire lens system, f1 indicates the focal length of the first lens L1, f2 indicates the focal length of the second lens L2, f3 indicates the focal length of the third lens L3, f4 indicates the focal length of the fourth lens L4, f5 indicates the focal length of the fifth lens L5, f12 indicates the composite focal length of the first and second lenses, and f345 indicates the composite focal length of the third to fifth lenses. The units of various data shown in Table 1 are millimeters (mm). The meaning of symbols in Table 1 is the same as that in the following examples.

TABLE 1

Lens Data

|  | R | D | Nd | γd |
|---|---|---|---|---|
| 1 | 15.16 | 1.80 | 1.5168 | 64.2 |
| 2 | 3.87 | 3.00 |  |  |
| 3 | 6.37 | 2.67 | 1.8340 | 37.2 |
| 4 | −12.98 | 0.10 |  |  |
| 5(APERTURE DIAPHRAGM) | ∞ | 1.42 |  |  |
| 6 | −5.77 | 0.80 | 1.9229 | 18.9 |
| 7 | 10.01 | 0.35 |  |  |
| 8 | −42.72 | 2.10 | 1.8348 | 42.7 |
| 9 | −5.52 | 0.10 |  |  |
| 10 | 12.56 | 2.10 | 1.8348 | 42.7 |
| 11 | −43.46 | 0.50 |  |  |
| 12 | ∞ | 0.40 | 1.5168 | 64.2 |
| 13 | ∞ | 5.76 |  |  |
| 14(IMAGE SURFACE) | ∞ | 0.00 |  |  |

Various Data

| L(in Air) | 21.0 |  |  |
|---|---|---|---|
| Bf(in Air) | 6.5 |  |  |
| f | 6.96 | f12 | 7.05 |
| f1 | −10.65 | f234 | 9.32 |
| f2 | 5.47 | f2345 | 7.16 |
| f3 | −3.87 | f345 | 14.58 |
| f4 | 7.41 |  |  |
| f5 | 11.87 |  |  |

Example 2

Figure 3:
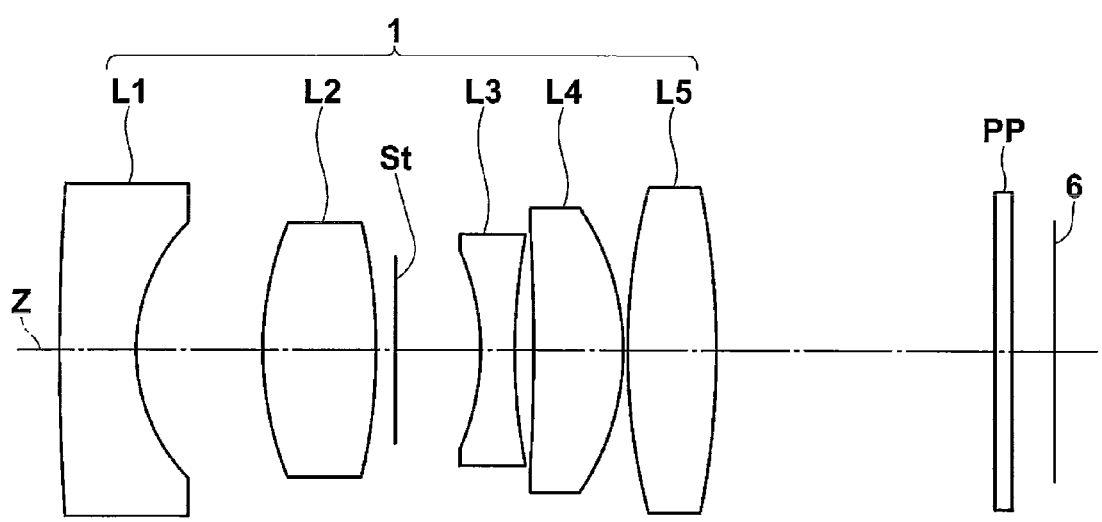
FIG. 3 is a cross-sectional view illustrating the structure of an imaging lens according to Example 2 of the invention.

Lens data, various data, and expression data of an imaging lens according to Example 2 are shown in Table 2, and the structure of the imaging lens is shown in FIG. 3.

TABLE 2

Lens Data

|  | R | D | Nd | γd |
|---|---|---|---|---|
| 1 | 56.37 | 1.80 | 1.5168 | 64.2 |
| 2 | 4.31 | 3.00 |  |  |
| 3 | 8.01 | 2.67 | 1.8340 | 37.2 |
| 4 | −13.07 | 0.46 |  |  |
| 5(APERTURE DIAPHRAGM) | ∞ | 2.00 |  |  |
| 6 | −5.83 | 0.80 | 1.9229 | 18.9 |
| 7 | 14.50 | 0.45 |  |  |
| 8 | −50.11 | 2.10 | 1.8348 | 42.7 |
| 9 | −6.03 | 0.10 |  |  |
| 10 | 14.93 | 2.10 | 1.7550 | 52.3 |
| 11 | −19.50 | 0.50 |  |  |
| 12 | ∞ | 0.40 | 1.5168 | 64.2 |
| 13 | ∞ | 7.05 |  |  |
| 14(IMAGE SURFACE) | ∞ | 0 |  |  |

Various Data

| L(in Air) | 20.8 |  |  |
|---|---|---|---|
| Bf(in Air) | 6.4 |  |  |
| f | 7.02 | f12 | 9.16 |
| f1 | −9.13 | f234 | 10.12 |

TABLE 2-continued

| f2 | 6.32 | f2345 | 8.15 |
|---|---|---|---|
| f3 | −4.42 | f345 | 11.98 |
| f4 | 8.03 |  |  |
| f5 | 11.50 |  |  |

Example 3

Figure 4:
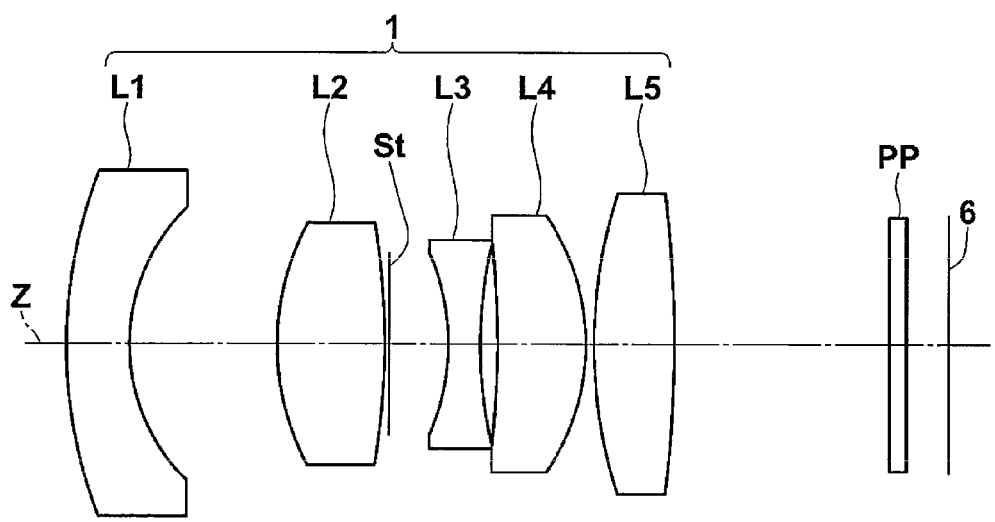
FIG. 4 is a cross-sectional view illustrating the structure of an imaging lens according to Example 3 of the invention.

Lens data, various data, and expression data of an imaging lens according to Example 3 are shown in Table 3, and the structure of the imaging lens is shown in FIG. 4.

TABLE 3

Lens Data

|  | R | D | Nd | γd |
|---|---|---|---|---|
| 1 | 11.54 | 1.50 | 1.5891 | 61.1 |
| 2 | 4.59 | 3.50 |  |  |
| 3 | 6.23 | 2.55 | 1.8340 | 37.2 |
| 4 | −17.70 | 0.10 |  |  |
| 5(APERTURE DIAPHRAGM) | ∞ | 1.42 |  |  |
| 6 | −5.43 | 0.75 | 1.9229 | 18.9 |
| 7 | 10.57 | 0.41 |  |  |
| 8 | −22.09 | 2.12 | 1.8348 | 42.7 |
| 9 | −5.37 | 0.20 |  |  |
| 10 | 11.82 | 1.90 | 1.8348 | 42.7 |
| 11 | −30.08 | 5.83 |  |  |
| 12 | ∞ | 0.40 | 1.5168 | 64.2 |
| 13 | ∞ | 0.26 |  |  |
| 14(IMAGE SURFACE) | ∞ | 0.00 |  |  |

Various Data

| L(in Air) | 20.8 |  |  |
|---|---|---|---|
| Bf(in Air) | 6.4 |  |  |
| f | 7.04 | f12 | 7.13 |
| f1 | −14.06 | f234 | 11.09 |
| f2 | 5.81 | f2345 | 7.50 |
| f3 | −3.80 | f345 | 12.33 |
| f4 | 8.03 |  |  |
| f5 | 10.38 |  |  |

Example 4

Figure 5:
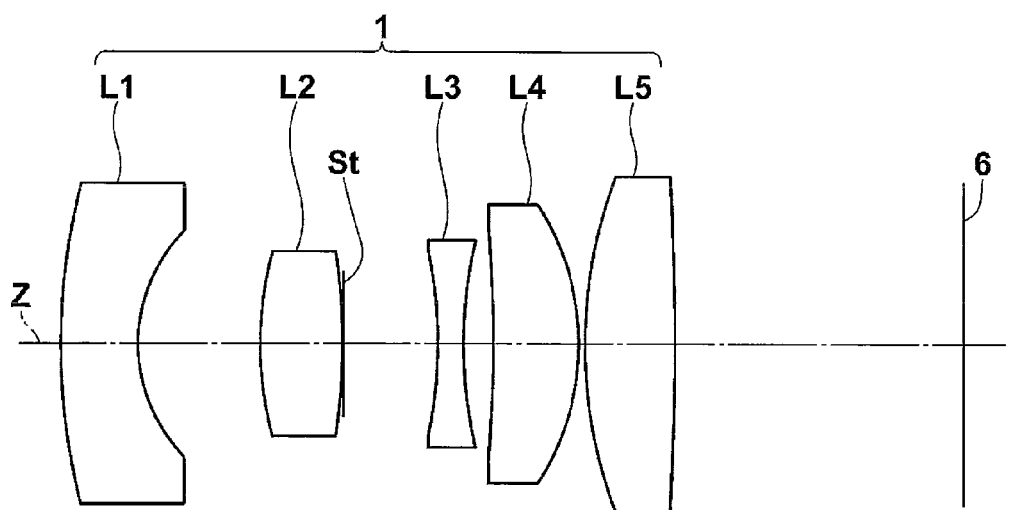
FIG. 5 is a cross-sectional view illustrating the structure of an imaging lens according to Example 4 of the invention.

Lens data, various data, and expression data of an imaging lens according to Example 4 are shown in Table 4, and the structure of the imaging lens is shown in FIG. 5.

TABLE 4

Lens Data

|  | R | D | Nd | γd |
|---|---|---|---|---|
| 1 | 15.28 | 1.84 | 1.5891 | 61.1 |
| 2 | 3.84 | 2.90 |  |  |
| 3 | 8.20 | 1.94 | 1.8340 | 37.2 |
| 4 | −15.02 | 0.02 |  |  |
| 5(APERTURE DIAPHRAGM) | ∞ | 2.25 |  |  |
| 6 | −10.70 | 0.60 | 1.9229 | 18.9 |
| 7 | 10.70 | 0.70 |  |  |
| 8 | −32.89 | 2.04 | 1.8040 | 46.6 |
| 9 | −6.02 | 0.15 |  |  |
| 10 | 11.08 | 2.14 | 1.7550 | 52.3 |
| 11 | −70.23 | 0.00 |  |  |
| 12 | ∞ | 0.00 | 1.5168 | 64.2 |

TABLE 4-continued

| | | |
|---|---|---|
| 13 | ∞ | 6.82 |
| 14(IMAGE SURFACE) | ∞ | 0.00 |

Various Data

| | | | |
|---|---|---|---|
| L(in Air) | 21.4 | | |
| Bf(in Air) | 6.8 | | |
| f | 7.03 | f12 | 10.30 |
| f1 | −10.50 | f234 | 9.62 |
| f2 | 6.61 | f2345 | 7.45 |
| f3 | −5.72 | f345 | 11.22 |
| f4 | 8.87 | | |
| f5 | 12.82 | | |

Example 5

Figure 6:
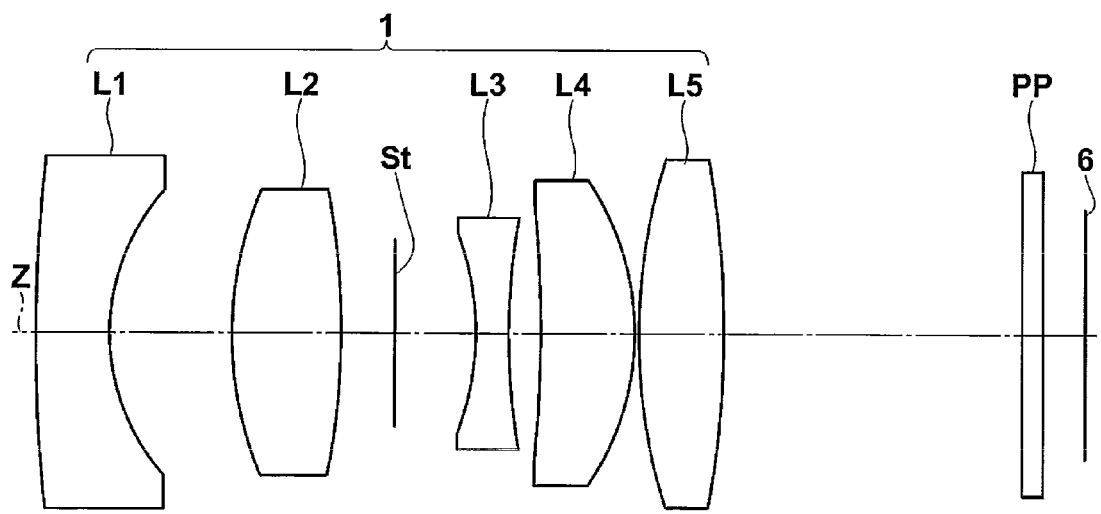
FIG. 6 is a cross-sectional view illustrating the structure of an imaging lens according to Example 5 of the invention.

Lens data, various data, and expression data of an imaging lens according to Example 5 are shown in Table 5, and the structure of the imaging lens is shown in FIG. 6.

TABLE 5

Lens Data

| | R | D | Nd | γd |
|---|---|---|---|---|
| 1 | 40.00 | 1.80 | 1.5168 | 64.2 |
| 2 | 5.28 | 3.00 | | |
| 3 | 9.18 | 2.67 | 1.8340 | 37.2 |
| 4 | −18.30 | 1.31 | | |
| 5(APERTURE DIAPHRAGM) | ∞ | 2.00 | | |
| 6 | −6.87 | 0.80 | 1.9229 | 18.9 |
| 7 | 16.57 | 0.79 | | |
| 8 | −31.72 | 2.30 | 1.8348 | 42.7 |
| 9 | −6.72 | 0.10 | | |
| 10 | 13.89 | 2.10 | 1.7550 | 52.3 |
| 11 | −23.92 | 0.50 | | |
| 12 | ∞ | 0.40 | 1.5168 | 64.2 |
| 13 | ∞ | 7.92 | | |
| 14(IMAGE SURFACE) | ∞ | 0.00 | | |

Various Data

| | | | |
|---|---|---|---|
| L(in Air) | 25.7 | | |
| Bf(in Air) | 8.8 | | |
| f | 8.27 | f12 | 12.03 |
| f1 | −11.97 | f234 | 12.65 |
| f2 | 7.67 | f2345 | 9.80 |
| f3 | −5.18 | f345 | 11.47 |
| f4 | 9.80 | | |
| f5 | 11.92 | | |

Example 6

Figure 7:
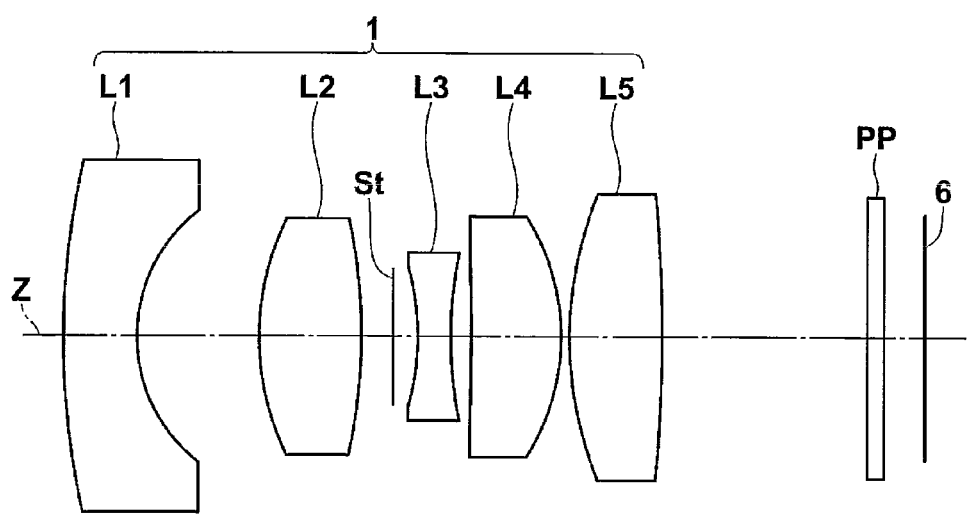
FIG. 7 is a cross-sectional view illustrating the structure of an imaging lens according to Example 6 of the invention.

Lens data, various data, and expression data of an imaging lens according to Example 6 are shown in Table 6, and the structure of the imaging lens is shown in FIG. 7.

TABLE 6

Lens Data

| | R | D | Nd | γd |
|---|---|---|---|---|
| 1 | 19.36 | 1.80 | 1.5168 | 64.2 |
| 2 | 3.88 | 3.00 | | |
| 3 | 6.59 | 2.50 | 1.8000 | 29.8 |

TABLE 6-continued

| | | | | |
|---|---|---|---|---|
| 4 | −13.53 | 0.78 | | |
| 5(APERTURE DIAPHRAGM) | ∞ | 0.60 | | |
| 6 | −6.25 | 0.80 | 1.9229 | 18.9 |
| 7 | 10.33 | 0.50 | | |
| 8 | −61.63 | 2.20 | 1.8040 | 46.6 |
| 9 | −5.46 | 0.20 | | |
| 10 | 9.08 | 2.27 | 1.7130 | 53.9 |
| 11 | −37.78 | 0.50 | | |
| 12 | ∞ | 0.40 | 1.5168 | 64.2 |
| 13 | ∞ | 5.50 | | |
| 14(IMAGE SURFACE) | ∞ | 0.00 | | |

Various Data

| | | | |
|---|---|---|---|
| L(in Air) | 20.9 | | |
| Bf(in Air) | 6.3 | | |
| f | 5.90 | f12 | 8.09 |
| f1 | −9.78 | f234 | 9.90 |
| f2 | 5.86 | f2345 | 6.87 |
| f3 | −4.12 | f345 | 9.36 |
| f4 | 7.33 | | |
| f5 | 10.48 | | |

Example 7

Figure 8:
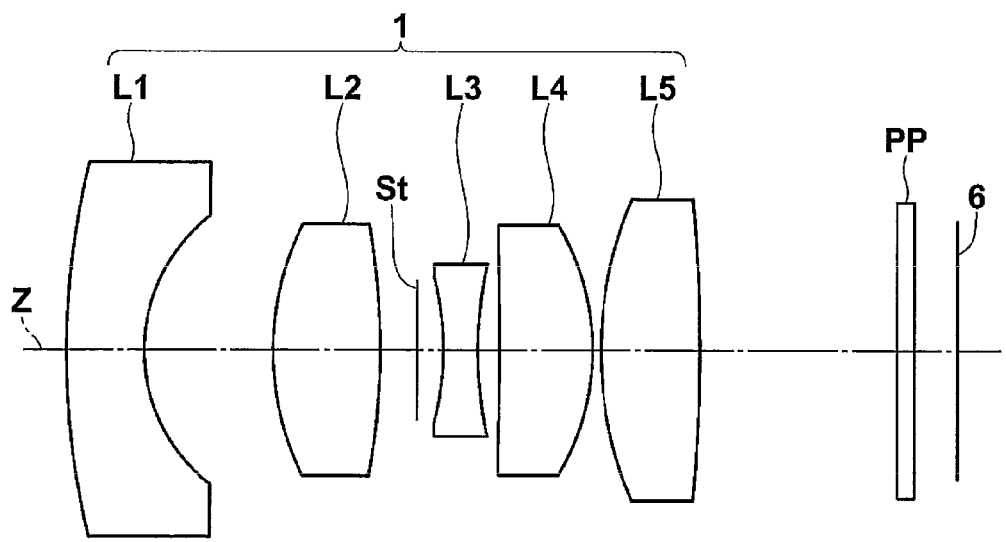
FIG. 8 is a cross-sectional view illustrating the structure of an imaging lens according to Example 7 of the invention.

Lens data, various data, and expression data of an imaging lens according to Example 7 are shown in Table 7, and the structure of the imaging lens is shown in FIG. 8.

TABLE 7

Lens Data

| | R | D | Nd | γd |
|---|---|---|---|---|
| 1 | 18.75 | 1.80 | 1.5168 | 64.2 |
| 2 | 3.95 | 3.00 | | |
| 3 | 6.59 | 2.50 | 1.8503 | 32.3 |
| 4 | −16.25 | 0.86 | | |
| 5(APERTURE DIAPHRAGM) | ∞ | 0.60 | | |
| 6 | −6.70 | 0.80 | 1.9229 | 18.9 |
| 7 | 9.35 | 0.50 | | |
| 8 | −99.60 | 2.17 | 1.8040 | 46.6 |
| 9 | −5.72 | 0.20 | | |
| 10 | 8.94 | 2.30 | 1.7550 | 52.3 |
| 11 | −37.78 | 0.50 | | |
| 12 | ∞ | 0.40 | 1.5168 | 64.2 |
| 13 | ∞ | 5.07 | | |
| 14(IMAGE SURFACE) | ∞ | 0.00 | | |

Various Data

| | | | |
|---|---|---|---|
| L(in Air) | 20.6 | | |
| Bf(in Air) | 5.8 | | |
| f | 5.90 | f12 | 7.95 |
| f1 | −10.10 | f234 | 9.77 |
| f2 | 5.80 | f2345 | 6.85 |
| f3 | −4.13 | f345 | 9.11 |
| f4 | 7.48 | | |
| f5 | 9.79 | | |

Example 8

Figure 9:
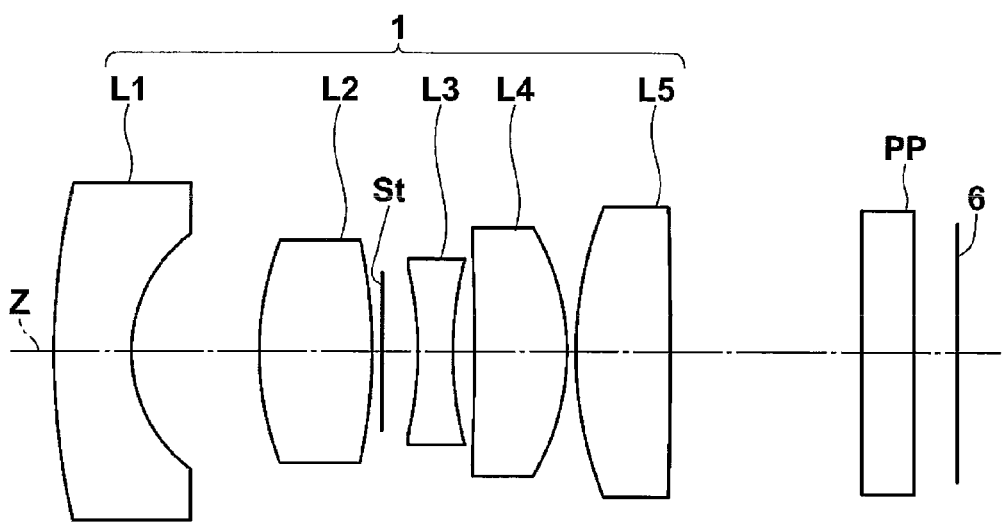
FIG. 9 is a cross-sectional view illustrating the structure of an imaging lens according to Example 8 of the invention.
Figure 16A:
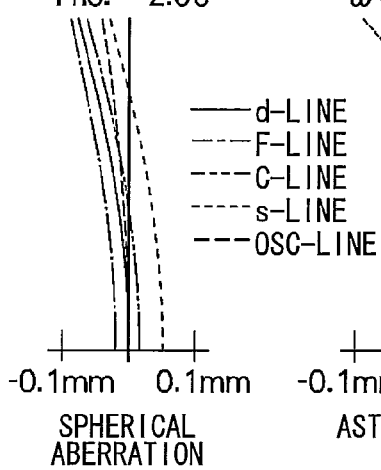
Figure 16B:
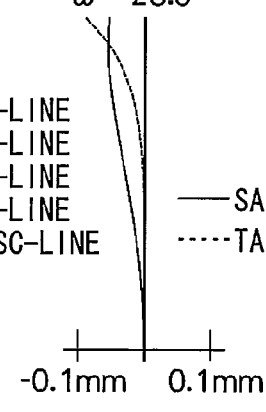
Figure 16C:
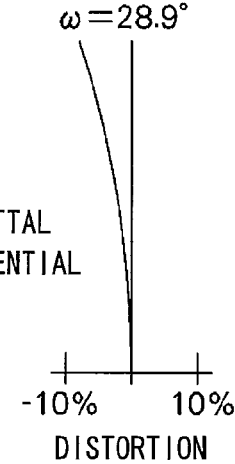
Figure 16D:
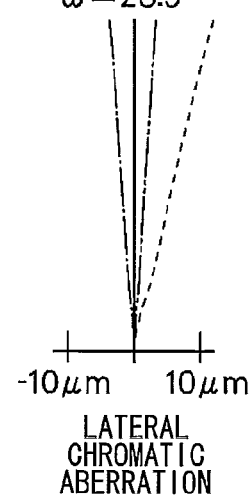
Figure 17A:
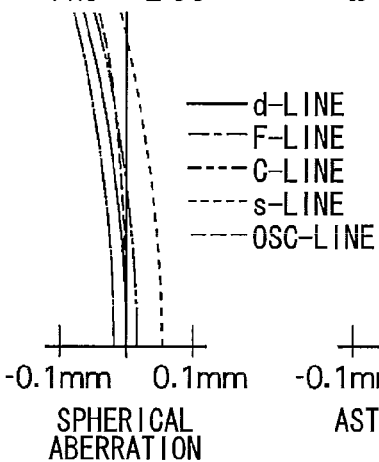
Figure 17B:
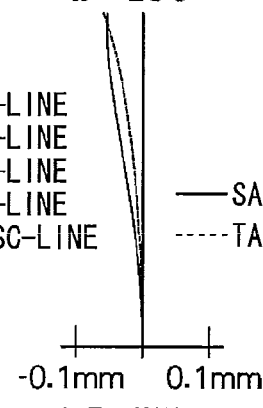
Figure 17C:
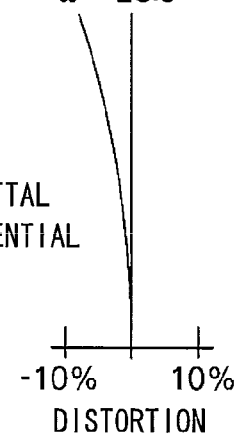
Figure 17D:
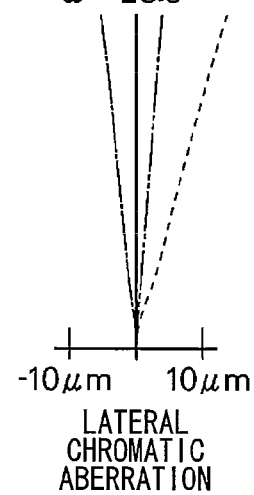

Lens data, various data, and expression data of an imaging lens according to Example 8 are shown in Table 8, and the structure of the imaging lens is shown in FIG. 9.

TABLE 8

Lens Data

| | R | D | Nd | γd |
|---|---|---|---|---|
| 1 | 17.12 | 1.80 | 1.5168 | 64.2 |
| 2 | 3.39 | 2.98 | | |
| 3 | 7.17 | 2.62 | 1.9037 | 31.3 |
| 4 | −12.11 | 0.24 | | |
| 5(APERTURE DIAPHRAGM) | ∞ | 0.82 | | |
| 6 | −8.39 | 0.80 | 1.9229 | 18.9 |
| 7 | 8.39 | 0.50 | | |
| 8 | −61.22 | 2.15 | 1.7550 | 52.3 |
| 9 | −5.59 | 0.20 | | |
| 10 | 9.13 | 2.20 | 1.7550 | 52.3 |
| 11 | 145.59 | 4.94 | | |
| 12 | ∞ | 1.20 | 1.5168 | 64.2 |
| 13 | ∞ | 0.50 | | |
| 14(IMAGE SURFACE) | ∞ | 0.00 | | |

Various Data

| L(in Air) | 20.5 | | |
|---|---|---|---|
| Bf(in Air) | 6.2 | | |
| f | 5.90 | f12 | 7.06 |
| f1 | −8.57 | f234 | 8.72 |
| f2 | 5.33 | f2345 | 6.45 |
| f3 | −4.44 | f345 | 11.82 |
| f4 | 8.01 | | |
| f5 | 11.45 | | |

Table 9 shows values corresponding to Conditional expressions 1 to 15 in the imaging lenses according to Examples 1 to 8. Table 9 shows the values at the d-line (wavelength: 587.56 nm). As can be seen from Table 9, Examples 1 to 8 satisfy all of Conditional expressions 1 to 15. In addition, Example 6 satisfies more severe Conditional expressions 3-2 and 4-2, and the examples other than Example 6 satisfy more severe Conditional expressions 3-2, 4-2, and 12-3.

TABLE 9

| | CONDITIONAL EXPRESSION | | | | | | | | | | | | | | |
|---|---|---|---|---|---|---|---|---|---|---|---|---|---|---|---|
| EXAM-PLE | (1) (D4 + D5)/f | (2) D1/f | (3) ν2 | (4) L | (5) f | (6) D2/f | (7) Bf/f | (8) f1/f | (9) f345/f | (10) \|R6/R7\| | (11) f12/f345 | (12) N2 | (13) f2/f | (14) L/f | (15) D4/D5 |
| 1 | 0.22 | 0.26 | 37.20 | 20.97 | 6.96 | 0.43 | 0.94 | −1.53 | 2.10 | 0.58 | 0.48 | 1.83 | 0.79 | 3.01 | 0.07 |
| 2 | 0.35 | 0.26 | 37.20 | 20.84 | 7.02 | 0.43 | 0.91 | −1.30 | 1.71 | 0.40 | 0.76 | 1.83 | 0.90 | 2.97 | 0.23 |
| 3 | 0.22 | 0.21 | 37.20 | 20.80 | 7.04 | 0.50 | 0.90 | −2.00 | 1.75 | 0.51 | 0.58 | 1.83 | 0.83 | 2.96 | 0.07 |
| 4 | 0.32 | 0.26 | 37.20 | 21.40 | 7.03 | 0.41 | 0.97 | −1.49 | 1.60 | 1.00 | 0.92 | 1.83 | 0.94 | 3.05 | 0.01 |
| 5 | 0.40 | 0.22 | 37.20 | 25.69 | 8.27 | 0.36 | 1.07 | −1.45 | 1.39 | 0.41 | 1.05 | 1.83 | 0.93 | 3.11 | 0.65 |
| 6 | 0.23 | 0.31 | 29.80 | 20.92 | 5.90 | 0.51 | 1.06 | −1.66 | 1.59 | 0.60 | 0.86 | 1.80 | 0.99 | 3.55 | 1.30 |
| 7 | 0.25 | 0.31 | 32.30 | 20.56 | 5.90 | 0.51 | 0.99 | −1.71 | 1.55 | 0.72 | 0.87 | 1.85 | 0.98 | 3.49 | 1.43 |
| 8 | 0.18 | 0.31 | 31.30 | 20.54 | 5.90 | 0.51 | 1.06 | −1.45 | 2.00 | 1.00 | 0.60 | 1.90 | 0.90 | 3.48 | 0.29 |

FIGS. 10 to 17 are diagrams illustrating the aberrations of the imaging lenses according to Examples 1 to 8, in which (A) shows spherical aberration, (B) shows astigmatism, (C) shows distortion, and (D) shows lateral chromatic aberration. Each of the aberration diagrams shows aberrations when the d-line (wavelength: 587.56 nm) is used as the reference wavelength. The spherical aberration diagram and the lateral chromatic aberration diagram also show aberrations at the F-line (wavelength: 486.13 nm), the C-line (wavelength: 656.27 nm), and the s-line (wavelength: 852.11 nm). The spherical aberration diagram also shows OSC (offence against the sine condition). The distortion diagram shows the amount of deviation from an ideal image height f tan θ when the focal length of the entire lens system is f and the incident angle of a beam on the lens is θ (a variable, 0≦θ≦ω). In the spherical aberration diagram, Fno. on the vertical axis indicates the F number. In the other aberration diagrams, ω on the vertical axis indicates a half angle of view.

As can be seen from (A) to (D) of FIGS. 10 to 17, the optical systems according to Examples 1 to 8 are fast optical systems having an F number of 1.8 to 2.5, and aberrations are effectively corrected. Therefore, the optical systems can be appropriately used to capture moving pictures.

The imaging lens 1 and the imaging lenses according to Examples 1 to 8 have a good optical performance, a small size, and low manufacturing costs. Therefore, the imaging lenses can be appropriately used for in-vehicle cameras that capture the images of the front, side, and rear of the vehicle.

Figure 18:
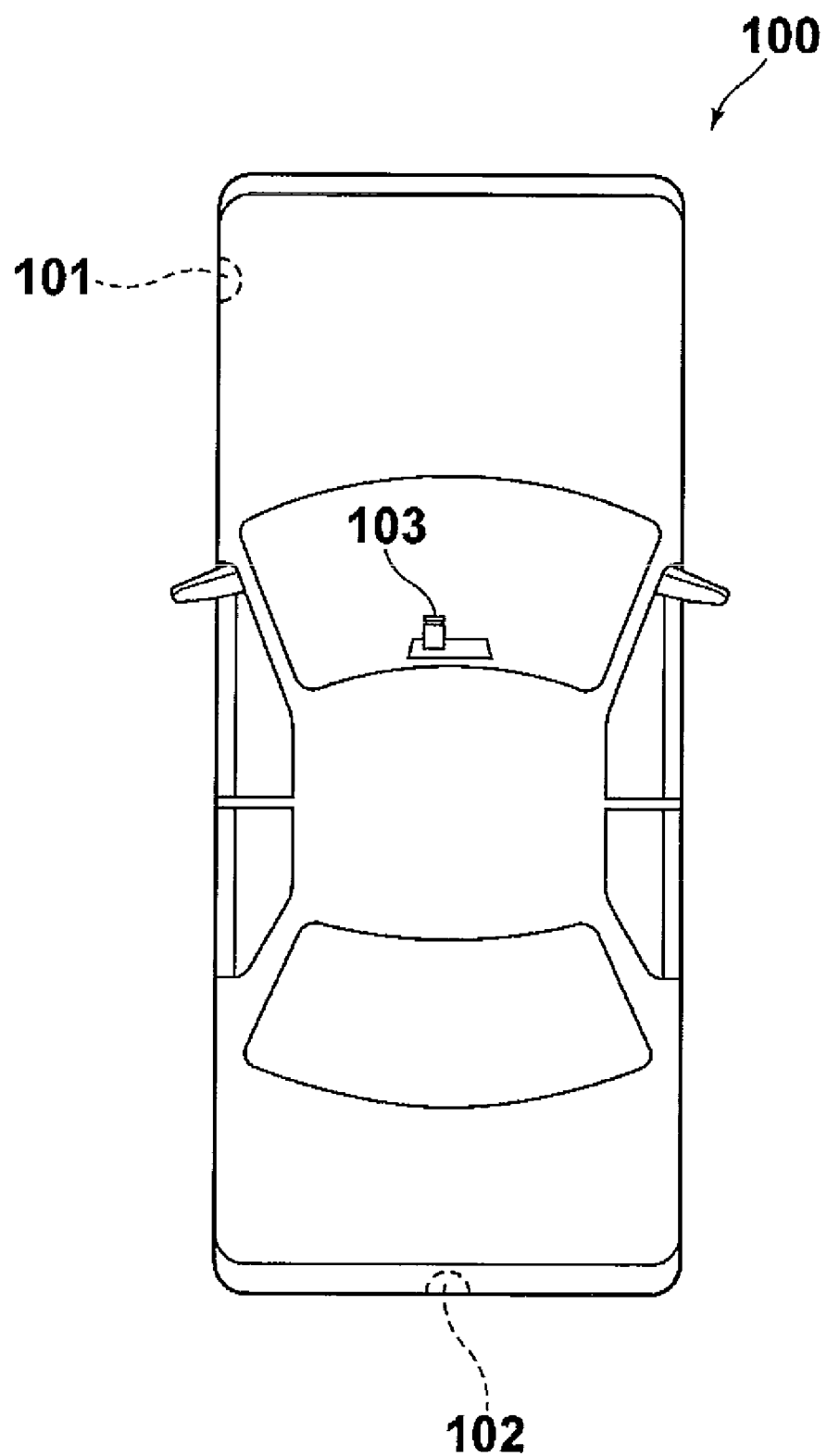
FIG. 18 is a diagram illustrating the arrangement of in-vehicle imaging apparatuses according to another embodiment of the invention.

FIG. 18 shows an example in which the imaging lens and the imaging apparatus according to this embodiment are provided in a vehicle 100. In FIG. 18, the vehicle 100 includes an outside camera 101 that captures the image of a passenger side blind spot, an outside camera 102 that captures the image of a blind spot on the rear side of the vehicle 100, and an inside camera 103 that is mounted to the rear surface of a room mirror and captures an image in the same visible range as that of a driver. Each of the outside camera 101, the outside camera 102, and the inside camera 103 is the imaging apparatus according to this embodiment of the invention, and includes the imaging lens 1 according to the embodiment of the invention and the imaging device 6 that converts an optical image formed by the imaging lens 1 into electric signals.

As described above, since the imaging lens 1 according to the embodiment of the invention has a small size and a good optical performance, each of the outside cameras 101 and 102 and the inside camera 103 can be manufactured with a small size, and it is possible to form a high-quality image on the image formation surface of the imaging device 6. In addition, since the imaging lens 1 can exhibit a sufficient optical performance without using an aspheric lens, the imaging lens can be manufactured at a low cost. Therefore, it is possible to manufacture the outside cameras 101 and 102 and the inside camera 103 at a low cost.

Although the embodiment and the examples of the invention have been described above, the invention is not limited to the embodiment and the examples, but various modifications and changes of the invention can be made. For example, the curvature radius, surface spacing, and refractive index of each lens component are not limited to the values of the above-described numerical examples, but each lens component may have other values.

Further, in the above-described embodiment of the invention, the imaging apparatus is applied to an in-vehicle camera as shown in the drawings, but the invention is not limited thereto. For example, the invention may be applied to a mobile terminal camera or a monitoring camera.

What is claimed is:

1. An imaging lens comprising:
   a first lens that has a negative power and includes a concave surface facing an image side;
   a second lens having a positive power;
   a stop;
   a third negative lens that is a biconcave lens;
   a fourth lens having a positive power; and
   a fifth lens that has a positive power and includes a convex surface facing the image side,
   wherein the first to fifth lenses are arranged in this order from the object side, and
   the imaging lens satisfies the following conditional expressions:

$$0.18 < (D4+D5)/f < 0.44, \text{ and}$$

$$0.18 < D1/f$$

where f denotes a focal length of an entire lens system, D1 denotes a thickness of a center of the first lens, D4 denotes a distance from an image-side surface of the second lens to the stop on an optical axis, and D5 denotes a distance from the stop to an object-side surface of the third lens on the optical axis.

2. The imaging lens according to claim 1,
   wherein the second lens is a biconvex lens, and
   an absolute value of a curvature radius of an object-side surface of the second lens is smaller than that of a curvature radius of the image-side surface of the second lens.

3. The imaging lens according to claim 1,
   wherein the fourth lens is a meniscus lens or a plano-convex lens having a convex surface facing the image side.

4. The imaging lens according to claim 1,
   wherein the fifth lens is a biconvex lens.

5. The imaging lens according to claim 1,
   wherein the imaging lens satisfies the following conditional expression:

$$v2 < 39$$

where v2 denotes the Abbe number of the second lens at the d-line.

6. The imaging lens according to claim 1,
   wherein the imaging lens satisfies the following conditional expression:

$$16.0 \text{ mm} < L < 27.0 \text{ mm}$$

where L denotes a distance from a top of an object-side surface of the first lens to an image formation surface.

7. The imaging lens according to claim 1,
   wherein the imaging lens satisfies the following conditional expression:

$$5.0 \text{ mm} < f < 9.0 \text{ mm}$$

where f denotes the focal length of the entire lens system.

8. The imaging lens according to claim 1,
   wherein the imaging lens satisfies the following conditional expression:

$$0.2 < D2/f < 0.7$$

where f denotes the focal length of the entire lens system, and D2 denotes an air space between the first lens and the second lens.

9. The imaging lens according to claim 1,
   wherein the imaging lens satisfies the following conditional expression:

$$0.5 < Bf/f < 1.5$$

where f denotes the focal length of the entire lens system, and Bf denotes an air equivalent distance from a top of an image-side surface of the fifth lens to an image formation surface.

10. The imaging lens according to claim 1,
    wherein the imaging lens satisfies the following conditional expression:

$$-2.2 < f1/f < -1.2$$

where f denotes the focal length of the entire lens system, and f1 denotes a focal length of the first lens.

11. The imaging lens according to claim 1,
    wherein the imaging lens satisfies the following conditional expression:

$$0.8 < f345/f$$

where f denotes the focal length of the entire lens system, and f345 denotes a composite focal length of the third to fifth lenses.

12. The imaging lens according to claim 1,
    wherein the imaging lens satisfies the following conditional expression:

$$0.30 < |R6/R7| < 1.50$$

where R6 denotes a curvature radius of the object-side surface of the third lens, and R7 denotes a curvature radius of an image-side surface of the third lens.

13. The imaging lens according to claim 1,
    wherein v1 is equal to or greater than 40, and v4 and v5 are equal to or greater than 35 where v1 denotes the Abbe number of the first lens at the d-line, v4 denotes the Abbe number of the fourth lens at the d-line, and v5 denotes the Abbe number of the fifth lens at the d-line.

14. The imaging lens according to claim 1,
    wherein the imaging lens satisfies the following conditional expression:

$$0.3 < |f12/f345| < 1.4$$

where f12 denotes a composite focal length of the first and second lenses, and f345 denotes a composite focal length of the third to fifth lenses.

15. An imaging apparatus comprising the imaging lens according to claim 1.

16. An imaging lens comprising:
    a first lens that has a negative power and includes a concave surface facing an image side;
    a second lens having a positive power;
    a stop;
    a third negative lens that is a biconcave lens;
    a fourth lens having a positive power; and
    a fifth lens that has a positive power and includes a convex surface facing the image side,
    wherein the first to fifth lenses are in order from the object side, and
    the imaging lens satisfies the following conditional expressions:

$$1.81 \leq N2 < 1.92, \text{ and}$$

$$25 < v2 < 38$$

where N2 denotes a refractive index of the second lens at a d-line, and v2 denotes the Abbe number of the second lens at the d-line.

* * * * *